United States Patent Office 3,092,587
Patented June 4, 1963

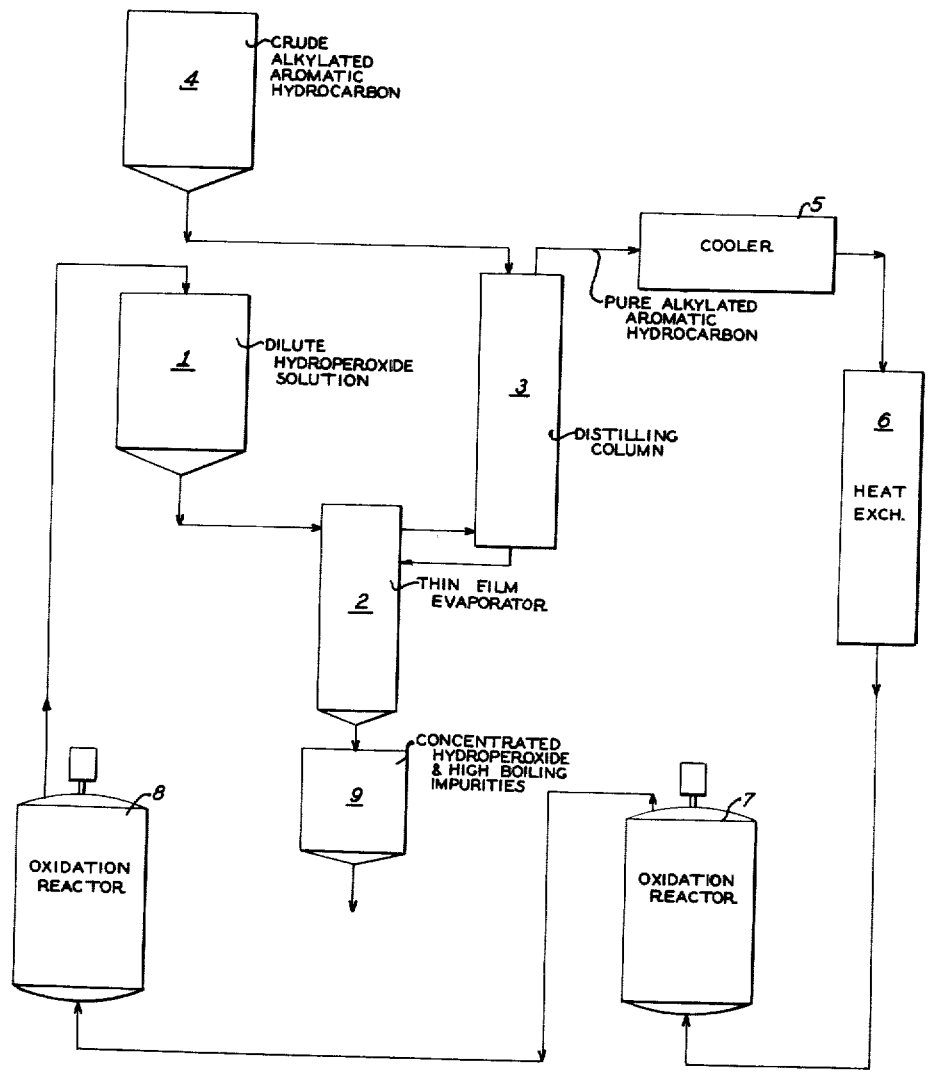

3,092,587
PROCESS FOR THE PRODUCTION OF HIGH PERCENTAGE SOLUTIONS OF ORGANIC PEROXIDES
Wilhelm Ester and August Sommer, Herne, Westphalia, Germany, assignors to Bergwerksgesellschaft Hibernia Aktiengesellschaft, Herne, Germany, a corporation of Germany
Filed July 12, 1960, Ser. No. 42,440
Claims priority, application Germany July 22, 1959
13 Claims. (Cl. 252—426)

The present invention relates to a process for the production of high percentage solutions of organic peroxides and more particularly to the production of such high percentage solutions from low percentage solutions of alkylated aromatic hydrocarbon organic peroxides by thin film evaporation and reflux measures.

In accordance with various industrial procedures peroxides are employed, such as cumenehydroperoxide, which must be present in highly concentrated form. Basically, it is possible to carry out an oxidation reaction of appropriate hydrocarbons such that a peroxide solution will be obtained having a comparatively high peroxide content. In this manner, by the oxidation of cumene, solutions may be obtained having up to a 50% hydroperoxide content. However, in practice, certain limitations are found with respect to this process, since upon reaching a certain peroxide content, the oxidation reaction product is predominantly exposed to decomposition. Accordingly, the over-all oxidation is rendered uneconomical to carry out.

Attempts to subsequently further concentrate such peroxide solutions to higher concentrations were always unsuccessful since at such concentrations, the peroxide content reacts with decomposition products present under extraordinary sensitivity to thermal influence. Heretofore, therefore, it has not been possible to produce organic peroxides of high concentrations having practically 100% purity.

It is known to treat hydrogen peroxide solutions in thin-film-evaporators. However, during the increase in concentration within the thin film evaporator, the danger exists that accumulations of impurities will deposit upon the evaporation surfaces within the thin-film evaporator. In order to offset the accumulation of such deposits, attempts have been made to maintain the peroxide solution flowing through the evaporator in turbulent motion along the evaporation surfaces. This is accomplished by providing suitable roller elements and oppositely moving vane elements in cooperation with the roller elements within the thin-film evaporator.

In any case, however, the evaporation must be conducted such that a portion of the solution is drawn off in non-evaporated form so that the harmful impurities will be accordingly removed. In consequence of the foregoing, it is only possible in practice to purify a peroxide solution without at the same time obtaining a sufficient increase in concentration as desired. For any further concentration, it is necessary to add to the hydrogen peroxide solution, volatile stabilizers which serve to prevent possible decomposition of the hydrogen peroxide. Nevertheless, this expedient results in the formation of deposits on the evaporation surfaces, such that it is difficult to maintain a uniform heat control. Additionally, frequent purification measures must nevertheless be employed.

It is an object of the present invention to overcome the foregoing disadvantages and to provide a process for the production of high percentage solutions of organic peroxide from low percentage solutions of organic peroxides by distilling such low percentage solutions in a thin-film evaporator while rectifying the distilling vapor mixture obtained therefrom under reflux with an alkaryl hydrocarbon compound, and recycling the sump product obtained in the rectifying back to the thin-film evaporator.

Other and further objects of the invention will become apparent from a study of the within specification and examples taken in connection with the accompanying drawing in which the FIGURE represents a schematic flow diagram of an apparatus for carrying out the process in accordance with the invention.

In accordance with the present invention, it has been found that an efficient increase in the concentration of organic peroxides may be provided by subjecting low percentage solutions of organic peroxides of the formula

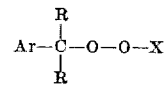

wherein R is alkyl, Ar is aryl, such as substituted and unsubstituted aryl compounds and X is selected from the group consisting of hydrogen and the radical

wherein Ar and R are the same as defined above, to distillation in a thin-film evaporator, recovering the high percentage solution of organic peroxide therefrom while rectifying the distilling vapor mixture obtained from the thin-film evaporator under reflux with an alk-aryl hydrocarbon compound, and recycling the residue obtained in the rectifying back to the thin-film evaporator.

Among the peroxides which may be concentrated in accordance with the invention are included cumene hydroperoxide, p-cymene hydroperoxide, isopropylnaphthalene hydroperoxide, diisopropylbenzene, mono- and/or dihydroperoxide, dicumyl peroxide, etc. Thus, generally, any alk-aryl hydrocarbon, such as alkylbenzene and alkylnaphthalene may be subjected to oxidation to form the corresponding hydroperoxides and these hydroperoxides may be conveniently concentrated in a thin-film evaporator. Advantageously, the distilling vapor mixture obtained from the head of the thin-film evaporator is rectified under reflux with the corresponding alk-aryl hydrocarbon compound used in the oxidation, i.e. alkyl-benzene, alkyl-naphthalene, etc.

Generally, in the preceding oxidation of such alk-aryl hydrocarbon compounds, the reaction mixture contains the corresponding organic peroxide in a concentration of from about 5–50%. This reaction mixture is distilled in a thin-film evaporator of conventional construction. The vaporous products accumulating in the head of the thin-film evaporator are rectified in the distillation column which is of conventional construction, such that the hydrocarbon compound used as starting material in the oxidation is first passed to the head of the distillation column. During the reflux in the distillation column, any impurities present in the starting hydrocarbon material are collected in the sump of the distillation column and passed on continuously to the head of the thin-film evaporator.

In this way, a very pure hydrocarbon starting material for the oxidation is obtained from the head of the distillation column. The same may be conducted forthwith to the oxidation process carried out in a separate reaction vessel. The hydrocarbon compound, as a consequence of the reflux, is freed from specific higher boiling impurities, such as dialkylated and higher alkylated products, higher alcohols, ketones, etc., which might otherwise disturb the course of the oxidation reaction. The impure products separated from the hydrocarbon compounds used as starting materials in the oxidation are carried along through the thin-film evaporator and are recovered with the concentrated solution of the organic peroxide. These impurities may include, for example, di- and triisopropylbenzene, methanol, thymol, carbinols, such as dimethylphenylcarbinol, acetophenone, etc.

Thus, from the lower portion of the thin-film evaporator a high percentage of organic peroxide solution is obtained together with certain impurities, from the hydrocarbon used as starting material in the oxidation. Significantly, these impurities do not disturbingly influence the organic peroxide obtained in high concentration particularly where such high percentage solutions of organic peroxides are employed as catalysts in the conventional manner. Actually, such impurities often perform the function of a stabilizer, so that in fact the removal of these impurities by special procedures is not even desirable. Of course, if the particular use of the high percentage organic peroxide solution is such that the presence of the impurities is not desired, it is possible to remove the same, for example, by further treatment of the high percentage organic peroxide solution in a thin-film evaporator.

In accordance with the process of the invention, it is thus possible to obtain in a very simple, safe, and efficient manner a very high yield of high percentage peroxides with practically no decomposition by products. Accordingly, for example, a 100% cumene hydroperoxide recovery may be attained which is conveniently useful for a number of applications, i.e. as activators in polymerization reactions in contrast to the formerly obtained low percentage solutions of hydroperoxides or other hydroperoxides such as for example terpenehydrocarbon hydroperoxides.

In accordance with the preferred embodiment of the invention, it is possible to adjust the conditions under which the concentration is carried out so as to suitably obtain in any desired case a product of a specific concentration. This is of great advantage, for example, in the phenol synthesis operation carried out by acid cleavage of cumenehydroperoxide, since very high concentrations of cumenehydroperoxide may be worked in the cleavage.

In accordance with the previous modes of operation, this was not possible since the oxidation product was first of all brought to a relatively high peroxide content, i.e. about 20%, and thereafter the reaction mixture was concentrated in suitable apparatus such as a rotary evaporator wherein concentrations of only as high as 40% peroxide could be obtained. Disadvantageously, on account of the high content of by products formed in the oxidation as well as in the subsequent further concentration procedures, it was not possible to effectively carry out the cleavage of such peroxides in high concentration solutions.

In contrast thereto, in accordance with the preferred embodiment of the invention, essentially higher yields of phenol and acetone may be obtained by suitably carrying out the oxidation, such that solutions are relatively low in peroxide content, such solutions being a 5–10% peroxide content. In this way, the formation of by-products is essentially inhibited and thus lower than was heretofore possible since a lower concentration is used. By carrying out the subsequent increase in concentration, using a thin-film evaporator, and in conjunction therewith a suitably connected distilling column, under reflux of the hydrocarbon used in the oxidation, the formation of unwanted by-products is substantially avoided. In this manner, the high percentage solutions of organic peroxides obtained may be readily converted by subsequent acid cleavage techniques to phenol and acetone with excellent yields.

The adjustment of the concentration of the peroxide solution in each case may be carried out in accordance with the process of the invention very simply by regulating the vapor quantities used in each case. Advantageously, the product recovered in the desired concentration contains certain impurities removed from the hydrocarbon component used in the distilling column reflux. These impurities may serve as stabilizers such that additional stabilizers are not necessary especially where the high concentration peroxide solution is employed as a catalyst.

The temperatures which may be used in the thin film evaporation in order to increase the concentration of the organic peroxide of the invention may be within the range of from about 40–150 degrees C. In this connection, it is preferred that the evaporation be carried out at pressures within the range of from about 1–50 torr (i.e. mm. Hg). Of course, where other pressures are used, the temperature range may change accordingly. Preferably, the same conditions of temperature and pressure are maintained in the after-connected distillation column as well as in the thin-film evaporator. Nevertheless, it is also possible to carry out the distillation at higher temperatures and pressures, i.e. pressures within the range of from 1 torr (i.e. mm. Hg) to normal pressure.

Suitably while the low percentage solution of the organic peroxide in accordance with the invention obtained from the oxidation of alk-aryl hydrocarbons, may be present in an amount of from 5–50% concentration, it is preferred that the low percentage solution have a concentration of from 5–10%. In this manner, upon subjecting the solution to thin-film evaporation and reflux with the alk-aryl hydrocarbon, a pure concentrated peroxide solution is obtained free from disturbing by products and decomposition products.

The following examples are set forth for the purpose of further illustrating the invention, and it is to be understood that the invention is not limited thereto. These examples are carried out using the apparatus shown in the accompanying drawing.

*Example 1*

A cumene hydroperoxide solution having a peroxide concentration of 20% in cumene flows from container 1 to the thin-film evaporator 2. The rising cumene vapors, which still contain peroxide, pass from the head of the thin-film evaporator 2 to the sump of column 3 wherein they are freed from the remaining peroxide. The cumene vapors pass from the head of the distilling column 3 into the cooler 5. From container 4, fresh cumene constantly passes to the head of the distilling column 3. This fresh cumene had been previously produced by alkylation of benzene and still contains higher boiling impurities, such as diisopropylbenzene and higher alkylation products, which act disturbingly in the oxidation procedure. These impurities are removed from the rising cumene vapors in distilling column 3 and passed from the lower end of distilling column 3 to the head of the thin-film evaporator 2 together with the peroxide content entrained in the cumene vapors passing from the head of thin-film evaporator 2 to distilling column 3. The impurities and further concentrated peroxide are recovered from the bottom portion of thin-film evaporator 2 by means of the storage container 9.

The cumene, in very pure form, due to the removal of higher boiling materials, such as diisopropylbenzene and higher alkylation products in column 3, upon condensation in cooler 5 flows to heat exchanger 6 and thence to the reactors 7 and 8 wherein the pure cumene is oxidized in the conventional manner. The oxidation reaction product thus formed passes back to container 1. The quantity of cumene used in the oxidation process amounted to 5.9 kilograms per hour while about 35 liters of diluted peroxide solution (20% concentration) were applied per hour and further concentrated in the thin-film evaporator to 70% concentration. The cumene used in the overall process was replaced in the cycle by means of fresh cumene being added from container 4. This corresponds to a reflux ration of 0.6:1 where the increase in concentration of the peroxide is carried out through a commercial concentration of 70%. During the increase in concentration, effected by means of the thin-film evaporator, and the distilling column rectification, no loss of peroxide could be ascertained. The peroxide quantity present in the dilute solution passed from container 1 to the thin-film evaporator 2 and was completely recovered in storage container 9 in favorable concentration yields without decomposition.

*Example 2*

A cymenehydroperoxide solution with a peroxide concentration of 6% was further concentrated in a thin-film evaporator in accordance with the procedure of Example 1. In the present example p-cymene was used which was oxidized to p-cymene hydroperoxide. The amount of p-cymene used amounted in this case to 3.9 kilograms per hour while about 62 liters of 6% dilute peroxide solution were produced per hour and further concentrated in the thin-film evaporator. Accordingly, p-cymene hydroperoxide was further concentrated to a concentration of 98% while the p-cymene which was used up was replaced by fresh p-cymene containing slight quantities of thymol and other impurities. The amount used corresponded to a reflux ratio of 0.07:1. No loss of peroxide could be ascertained and the concentrate at 98% was excellently stabilized.

*Example 3*

In accordance with the procedure of Example 1, a 10% solution of dicumylperoxide, produced in the conventional manner, from cumenehydroperoxide, was further concentrated to a concentration of 86%. The amount of reflux material resulted in a ratio of 0.12:1. No peroxide losses occurred.

What is claimed is:

1. A process for the production of high percentage hydrocarbon solutions of organic peroxides of the formula

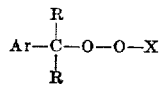

wherein R is alkyl, Ar is aryl and X is selected from the group consisting of hydrogen and the radical

wherein Ar and R are the same as defined above, from a low percentage solution of organic peroxide of said formula, which comprises distilling said low percentage solution in a thin-film evaporator, recovering said high percentage hydrocarbon solution of organic peroxide therefrom while rectifying the distilling vapor mixture obtained from said thin-film evaporator in a rectifying zone in contact with an alkaryl hydrocarbon compound in liquid form, said alkaryl hydrocarbon compound corresponding to the hydrocarbon of the original hydrocarbon solution of the organic peroxide, and recycling the residue obtained in the rectifying back to the thin film evaporator.

2. The process according to claim 1 wherein the low percentage solution had an organic peroxide content of from 5 to 10%.

3. The process according to claim 2 wherein the low percentage solution was obtained by the oxidation of an alkaryl hydrocarbon.

4. The process according to claim 3 wherein said alkaryl hydrocarbon is an alkyl benzene.

5. A process for the production of a high percentage solution of an alkyl-aryl hydrocarbon peroxide in the corresponding alkyl-aryl hydrocarbon as solvent from a low percentage solution of said peroxide in said solvent, which comprises subjecting said low percentage solution to thin film evaporation in a first zone to vaporize said hydrocarbon, passing the vaporized hydrocarbon in vapor form from the first zone to a second zone, contacting said hydrocarbon in vapor form in the second zone with fresh hydrocarbon in liquid form, said fresh hydrocarbon corresponding to the hydrocarbon used as solvent, maintaining the temperature and pressure in the second zone sufficient to vaporize the hydrocarbon in the second zone, returning any peroxide carried over with said hydrocarbon in vapor form to the second zone back to the first zone, and recovering the high percentage peroxide solution from the first zone.

6. A process according to claim 5 wherein the low percentage solution has a peroxide content of from 5 to 50%, the vaporized hydrocarbon in the second zone being recovered as purified alkyl-aryl hydrocarbon and recycled, upon condensation, to the oxidation of the corresponding hydrocarbon as starting material, the first zone being maintained at a temperature of from about 40–150° C. and a pressure of from about 1–50 mm. Hg, and the second zone being maintained at a pressure of from about 1 mm. Hg to normal pressure.

7. In the process for the production of a high percentage solution of an alkylated benzene hydrocarbon hydroperoxide in the corresponding alkylated benzene hydrocarbon as solvent from a low percentage solution of said peroxide in said hydrocarbon, wherein said alkylated benzene hydrocarbon is subjected to oxidation to form the corresponding hydroperoxide in low percentage solution having a peroxide content of from about 5 to 50%, the improvement which comprises subjecting said low percentage solution to thin film evaporation in a first zone to vaporize said hydrocarbon, passing the vaporized hydrocarbon in vapor form from the first zone to a second zone, contacting said hydrocarbon in vapor form in the second zone with fresh hydrocarbon in liquid form, said fresh hydrocarbon corresponding to the hydrocarbon used as solvent, maintaining the temperature and pressure in the second zone sufficient to vaporize the hydrocarbon in the second zone, returning any peroxide carried over with said hydrocarbon in vapor form to the second zone back to the first zone, and recovering the concentrated high percentage peroxide solution from the first zone, the vaporized alkylated benzene hydrocarbon from the second zone being recovered, thereafter condensed and passed for use as starting material in the oxidation.

8. The improvement according to claim 7 wherein the first zone is maintained at a temperature of from about 40–150° C. and at a pressure of from about 1–50 mm. Hg, and the second zone is maintained at a pressure of from about 1 mm. Hg to normal pressure.

9. A process for the concentration of alkyl-aryl hydrocarbon hydroperoxide solutions in a hydrocarbon solvent in which the solvent is the corresponding alkyl-aryl hydrocarbon having higher vapor pressure than said hydroperoxide, which comprises passing a film of said hydroperoxide solution through a first zone at a temperature and pressure sufficient to vaporize at least a portion of said solvent, passing the vapors from said first zone to a second zone, feeding fresh hydrocarbon solvent into said second zone corresponding to the alkyl-aryl hydrocarbon originally used as solvent, maintaining said second zone at a temperature and pressure that the substantially pure alkyl-aryl hydrocarbon is vaporized, recovering said substantially pure alkyl-aryl hydrocarbon from said second zone, while returning any hydroperoxide carried over with said vapors to the second zone back to the first zone, and recovering the hydroperoxide enriched hydrocarbon from said first zone.

10. A process according to claim 9 wherein the hydrocarbon solvent fed to the second zone additionally contains substances of boiling point higher than said hydrocarbon solvent, whereby the recovery of the substantially pure hydrocarbon from said second zone, the return of the higher-boiling substances and of the hydroperoxide to said first zone, and their removal therefrom, are facilitated.

11. A process according to claim 9 wherein the hydrocarbon solvent used is cumene, the hydroperoxide is cumene hydroperoxide, and the fresh solvent fed to the second zone is cumene and is passed into contact with the pure cumene being vaporized therein to cause a portion of the vaporized cumene to condense within said second zone upon contact therewith, the reflux ratio of cumene from the second zone to the first zone being about 0.6:1.

12. A process according to claim 9 wherein the hydrocarbon solvent used is cymene, the hydroperoxide is cymene hydroperoxide, and the fresh solvent fed to the second zone is cymene and is passed into contact with the pure cymene being vaporized therein to cause a portion of the vaporized cymene to condense within said second zone upon contact therewith, the reflux ratio of cymene from the second zone to the first zone being about 0.07:1.

13. A process according to claim 9 wherein the hydrocarbon solvent used is dicumyl, the hydroperoxide is dicumyl hydroperoxide, and the fresh solvent fed to the second zone is dicumyl and is passed into contact with the pure dicumyl being vaporized therein to cause a portion of the vaporized dicumyl to condense within said second zone upon contact therewith, the reflux ratio of dicumyl from the second zone to the first zone being about 0.12:1.

References Cited in the file of this patent

UNITED STATES PATENTS

| | | |
|---|---|---|
| 2,520,870 | Wood et al. | Aug. 29, 1950 |
| 2,706,708 | Frank et al. | Apr. 19, 1955 |
| 2,722,506 | Ellis | Nov. 1, 1955 |
| 2,915,558 | Alders et al. | Dec. 1, 1959 |

UNITED STATES PATENT OFFICE
CERTIFICATE OF CORRECTION

Patent No. 3,092,587 June 4, 1963

Wilhelm Ester et al.

It is hereby certified that error appears in the above numbered patent requiring correction and that the said Letters Patent should read as corrected below.

Column 5, line 48, strike out "hydrocarbon" and insert the same before "solution" in line 45, same column 5.

Signed and sealed this 14th day of January 1964.

(SEAL)
Attest:

ERNEST W. SWIDER

Attesting Officer

EDWIN L. REYNOLDS

Acting Commissioner of Patents